J. H. SHEKLETON.
LOCK NUT.
APPLICATION FILED NOV. 13, 1913.
1,130,851.
Patented Mar. 9, 1915.
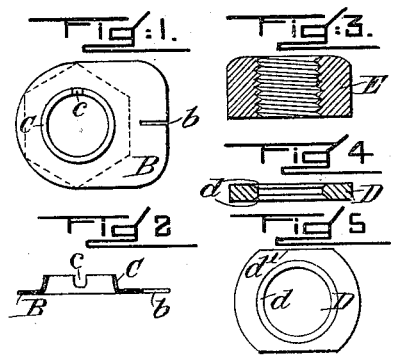
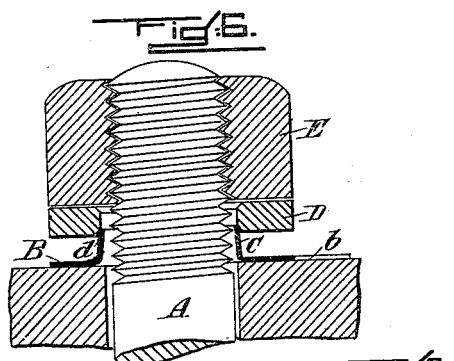
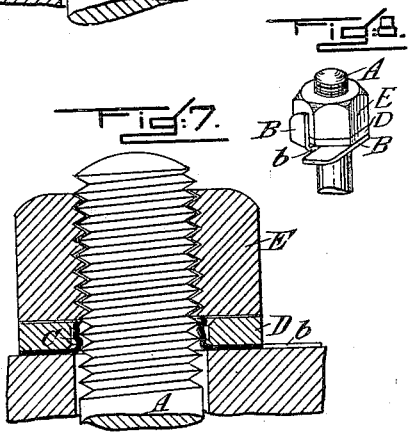
WITNESSES:
John C. Sanders
Albert T. Newman
INVENTOR:
James Hardgrave Shekleton
By W. Wallace White
ATT'Y

UNITED STATES PATENT OFFICE.

JAMES HARDGRAVE SHEKLETON, OF DARLINGHURST, NEW SOUTH WALES, AUSTRALIA.

LOCK-NUT.

1,130,851.     Specification of Letters Patent.     Patented Mar. 9, 1915.

Application filed November 13, 1913. Serial No. 800,712.

*To all whom it may concern:*

Be it known that I, JAMES HARDGRAVE SHEKLETON, subject of the King of Great Britain and Ireland, residing at 199 Victoria street, Darlinghurst, in the State of New South Wales, Commonwealth of Australia, have invented new and useful Improvements in Lock-Nuts, of which the following is a specification.

The essential features of the improved lock-nut are two washers; one of which will be thin and of, approximately, oval shape with a cylindrical or slightly tapering projection concentric with the regular curve at one end of the oval; in the wall of the tapering projection will be a gap so that the wall of the projection will be adapted to be compressed inward with moderate facility; the end of the washer most remote from the projection will be slit, preferably, at right angles to a radial line that would pass through the center of the gap in the projection; the height of the projection will be about equal to the width of two of the screw threads on the bolt.

The compression washer will be the usual annulus, but of a thickness equal to the height of the projection on the other washer; one or both edges of the central aperture will be chamfered off so as to form annular inclines which have an important function.

The oval washer will be first put on the bolt, then the compression washer, then the nut which will be screwed down forcing the compression washer over the projection and compressing the wall thereof on to the threads of the screw on the bolt. When the nut has been screwed quite down, one of the projecting parts on either side of the slit in the oval washer will be turned up against one of the flats of the nut, and the nut will be locked.

In the accompanying drawings: Figure 1 is a plan of the oval washer. Fig. 2 is a longitudinal section through the center of the same. Fig. 3 is an axial section of a standard nut. Fig. 4 is an axial section of the compression washer. Fig. 5 is a plan of the same. Fig. 6 is an axial section of the nut and washers, the bolt being in elevation. This view shows the nut and the washers installed in position, but the nut is not screwed down. Fig. 7 is a similar view, but with the nut screwed down. Fig. 8 is a perspective view of the nut and compression washer screwed down and the tail of the oval washer turned up locking the nut. The Figs. 1 to 5 have been drawn to half the scale of Figs. 6 and 7.

A is a standard 1″ bolt with eight threads to the inch.

B is the, approximately, oval washer with a cylindrical, or slightly tapering, projection C concentric with the regular curve at one end of the oval washer; the regular curve at the periphery of the washer will have a radius equal to the radius of a hexagonal nut from the center to one of the corners. The other end of the oval washer will project beyond the nut, as may be seen by considering the dotted lines showing the outline of a nut in Fig. 1. The cylindrical or tapering projection C will have a gap $c$ in its wall and the projecting end of the oval washer will be split at $b$ by a line at right angles to the position of the gap $c$. The height of the tapering projection C should be a little more than the width of two threads of the screw on the bolt, so as to allow the tapering projection to be squeezed into the threads of the screw without greatly diminishing its height, as shown in Fig. 7. The next important element in the locking combination is the washer D, shown separately at Figs. 4 and 5. The thickness of the compression washer D will be equal to the height of the tapering projection C, and the edges of the central aperture will be beveled or chamfered off, as shown in Fig. 4 at $d$. As the tendency of the washer D would be to jam on the projection C when it is forced down by the pressure of the nut above, it may be provided with two flats $d'$ Fig. 5, to receive a spanner by which it may be unscrewed. When the two washers B and D, have been placed in position, as shown in Fig. 6, a standard nut E will be screwed on to the bolt and screwed down until the gapped wall of the projection C is squeezed on to the threads of the screw on the bolt, as shown at Fig. 7. One of the free ends of the washer B, on either side of the slit $b$ will then be turned up against one of the flats of the nut E, and the nut will be locked as shown in Fig. 8.

I claim:—

1. In nut locks, in combination, a bolt, a nut on said bolt, a washer provided with a compressible annular projection for the nut, and a second washer adapted to surround and engage said annular projection to compress the same, and means for locking said nut from said washer.

2. In nut locks, in combination, a bolt, a nut on said bolt, a washer provided with a compressible annular projection for the nut, and a second washer adapted to surround and engage said annular projection to compress the same, one of the edges of the aperture in said second washer being chamfered, and means for locking said nut from said washer.

3. In nut locks, in combination, a bolt, a nut threaded on said bolt, a washer provided with a compressible annular projection for the nut, said projection being non-resilient, and a second washer adapted to surround and engage said annular projection to compress the same against the threads of the bolt, and means for locking the nut from said washers.

4. In nut locks, in combination, a bolt, a nut threaded on said bolt, a washer provided with a thin annular compressible non-resilient projection for the nut, and a second washer adapted to surround and engage said annular projection to compress the same, and means for locking the nut from said washers.

5. In combination, a bolt provided with threads, a washer upon said bolt and provided with a compressible annular projection, and a second washer surrounding and engaging said annular projection, a nut threaded on the bolt, the aperture of said second washer being of such a diameter that when it engages said projection the latter will be compressed and forced into intimate engagement with the threads of the bolt.

In testimony whereof I have signed my name to this specification in the presence of two subscribing witnesses.

JAMES HARDGRAVE SHEKLETON.

Witnesses:
A. MASSEY,
H. C. CAMPBELL.

Copies of this patent may be obtained for five cents each, by addressing the "Commissioner of Patents, Washington, D. C."